US008468355B2

(12) United States Patent
Gerdes, Jr. et al.

(10) Patent No.: US 8,468,355 B2
(45) Date of Patent: Jun. 18, 2013

(54) MULTI-DIMENSIONAL CREDENTIALING USING VEILED CERTIFICATES

(75) Inventors: John H. Gerdes, Jr., Cayce, SC (US); Joakim Kalvenes, Dallas, TX (US); Chin-Tser Huang, Irmo, SC (US)

(73) Assignee: University of South Carolina, Columbia, SC (US)

( * ) Notice: Subject to any disclaimer, the term of this patent is extended or adjusted under 35 U.S.C. 154(b) by 588 days.

(21) Appl. No.: 12/643,364

(22) Filed: Dec. 21, 2009

(65) Prior Publication Data

US 2010/0185864 A1 Jul. 22, 2010

Related U.S. Application Data

(60) Provisional application No. 61/203,251, filed on Dec. 19, 2008.

(51) Int. Cl.
*H04L 9/32* (2006.01)

(52) U.S. Cl.
USPC ............. 713/175; 713/170; 713/176; 726/10; 726/19

(58) Field of Classification Search
None
See application file for complete search history.

(56) References Cited

U.S. PATENT DOCUMENTS 6,389,136 B1 * 5/2002 Young et al. ................. 380/28
2006/0129817 A1 * 6/2006 Borneman et al. ............ 713/170

OTHER PUBLICATIONS

Gerdes, Jr., "The Viability of Supporting Anonymous Employees", ACM, Apr. 2004, pp. 98-100.*

Burnett et al., "A Biometric Identity Based Signature Scheme" International Journal of Network Security, Nov. 2007, pp. 1-10.*
Abelson et al., "Digital Identity in Cyberspace", White Paper submitted for Law of Cyberspace: Social Protocols, 1998.
Aweya et al., "An Adaptive Load Balancing Scheme for Web Servers", International Journal of Network Management, vol. 12, No. 1, Jan./Feb. 2002, pp. 3-39.
Bhargav-Spantzel et al., "User Centricity: A Taxonomy and Open Issues", Proceedings of the Second ACM Workshop of Digital Identity Management, 2006, pp. 1-10.
Brands, "Rethinking Public Key Infrastructures and Digital Certificates—Building in Privacy", Doctoral Dissertation, Technische Universiteit Eindhoven, 1999.
Burnett et at., "A Biometric Identity Based Signature Scheme", International Journal of Network Security, vol. 5, No. 3, 2007, pp. 317-326.

(Continued)

*Primary Examiner* — Shewaye Gelagay
(74) *Attorney, Agent, or Firm* — Dority & Manning, P.A.

(57) ABSTRACT

In accordance with certain embodiments of the present disclosure, a method for creating a veiled certificate is provided. The method comprises requesting a certificate from a regulator by sending a message with a digital signature of the message signed by the owner. The message comprises an owner's veiled certificate token, the veiled certificate token comprising an encrypted version of the owner's identification data and the owner's identification public key for the certificate. The message further comprises the identification public key, the whole message being encrypted using the regulator's external public key. The certificate request is validated by verifying the sender's identity through validation of the digital signature using the owner's external public key and verifying the veiled certificate token using the individual' external public key. A veiled certificate is created by combining the veiled certificate token, identification public key and digitally signing the veiled certificate with the regulator's private key, wherein the owner's identification information is inaccessible from the veiled certificate, except to the certificate owner.

9 Claims, 3 Drawing Sheets

OTHER PUBLICATIONS

Camenisch et al., "A General Certification Framework with Applications to Privacy-Enhancing Certificate Infrastructures", Proceedings of the IFIP TC-11 21$^{st}$ International Information Security Conference (SEC 2006), 2006, pp. 25-37.

Chaum, "Blind Signatures for Untraceable Payments" Advances in Cryptology: Proceedings of Crypto' 82, Plenum Press, 1983, pp. 199-203.

Chaum, "Security Without Identification: Transaction Systems to Make Big Brother Obsolete", Communications of the ACM, vol. 28, No. 10, 1985, pp. 1030-1044.

DHSAT, "DHS Authentication Technologies Overview", U.S. Department of Homeland Security Authentication Technologies, 2005 https://dhscio.net/dhs_info_center.html (accessed on Oct. 26, 2005).

Dodis et al., "Fuzzy Extractors: How to Generate Strong Keys from Biometrics and Other Noisy Data", SIAM Journal on Computing, vol. 38, No. 1, 2008, pp. 97-139.

Farrell, "An Internet Attribute Certificate Profile for Authorization", The Internet Engineering Task Force Network Working Group, RFC 3281 (Proposed Standard, Apr. 2002.

Gerdes, "The Viability of Supporting Anonymous Employees", Communications of the ACM, vol. 47, No. 4, Apr. 2004, pp. 98-100.

Gladman et al., "Digital Signatures, Certificates and Electronic Commerce" Jun. 1999.

IETF, Internet X.509 v3 Public Key Infrastructure Certificate and CRL Profile, The Internet Society, Jan. 1999.

IETF-NWG, "Internet X.509 Public Key Infrastructure—Certificate Management Protocols", Internet Engineering Task Force, Network Working Group, Mar. 1999.

IETF-NWG, "Internet X.509 Public Key infrastructure, Certificate and Certificate Revocation List (CRL) Profile", Internet Engineering Task Force, Network Working Group, Apr. 2002.

Naor et al, "Certificate Revocation and Certificate Update", Proceedings of the 7$^{th}$ USENIX Security Symposium, San Antonio, TX, Jan. 1998,pp. 26-29.

O'Connor, Chase Offers Contactless Cards in a Blink, RFID Journal, May 24, 2005.

Privacy Rights Clearinghouse, "A Chronology of Data Breaches", Posed Apr. 20, 2005, Updated Aug. 30, 2008 http://www.privacyrights.org/ar/ChronDataBreaches.htm).

Rivest et al., "A Method for Obtaining Digital Signatures and Public-Key Cryptosystems", Communications of the ACM, vol. 21, No. 2, 1978, pp. 120-126.

Schneier, Applied Cryptography, John Wiley, New York, New York, 1996.

SSA, "Social Security: Your Number", Social Security Administration Publication No. 05-10002, Oct. 1996.

SC DMV, Accepted Forms of Identification, South Carolina Department of Motor Vehicles, 2007.

Stadler et al., "Fair Blind Signatures" in Advances in Cryptology—Eurocrypt '95, Lecture Notes in Computer Science, vol. 921, Springer-Verlag, 1995, pp. 209-219.

WAM, "Social Security Number Privacy and Identity Theft Prevent Act of 2004", H.R. 2971, Ways and Means Committee, Jul. 19, 2004.

Westin, Privacy and Freedom, Antheum, New York, New York, 1967.

Wolf, et al., "On Balancing the Load in a Clustered Web Farm", ACM Transactions on Internet Technology, vol. 1, No. 2, 2001 pp. 231-261.

Wright, et al., "Efficient Fault-Tolerant Certificate Revocation", Proceedings of the 7$^{th}$ ACM Conference on Computer and Communications Security, Athens, Greece, 2000, pp. 19-24.

\* cited by examiner

- Local Validation includes: Confirm Tokens are the same, Validate CA's signatures on VCs, Test if DS signed with private key, and DS text is appropriate.

- CA Validation includes: Check revocation list, Validate DS signature and content.

MULTI-DIMENSIONAL CREDENTIALING USING VEILED CERTIFICATES

CROSS-REFERENCE TO RELATED APPLICATION

The present application is based on and claims priority to U.S. Provisional Application 61/203,251 having a filing date of Dec. 19, 2008, which is incorporated by reference herein.

BACKGROUND

Modern information systems depend on unique identifiers to distinguish individuals. While this provides important benefits, it can impact personal privacy and lead to identity theft. These risks are increased when organizations use common identifiers to uniquely identify individuals, for this allows cross-linking and aggregation of multiple, independent information sources. For example, the social security number (SSN) issued by the United States has been used as an identifier for a variety of different purposes including as a student identification (ID) number, employee ID number, driver's license number, insurance plan ID number, and the like. Even when an organization does not adopt the SSN as its ID, it still may require it so that government mandated reports can be filed at the individual level. Organizations routinely collect personal identifiers issued by various public and corporate entities, such as passport numbers, military ID numbers, insurance coverage ID numbers, and credit card numbers. Each additional identifier facilitates the cross-linking to other information systems, which increases the risk of identity theft.

While organizations have a responsibility to store sensitive data securely there are numerous instances where large, corporate information systems have been breached. For instance, between January 2005 and August 2008 over 1,000 reported security breaches exposed more than 244 million records containing sensitive personal information. While exposure of personal data can impose real hardship for affected individuals, such breaches are also a source of significant liability and cost to owners of compromised systems.

The underlying problem is that individuals have lost control over their personal identifiers (PIs). The purpose of a PI is to uniquely identify an individual to the issuing organization, be it a social security agency, a credit card company, an insurance firm, or the like. However, once individuals disclose their PI to the third party they lose control over how it is used.

It is common for organizations to request multiple forms of identification, each certifying a different attribute of the individual, and issued by different independent agents. For example:

Individuals are often asked for a driver's license when making a check or credit card purchase.

Patients must produce insurance cards, a driver's license or some other form of ID, and a credit card to receive medical services.

State Departments of Motor Vehicles (DMV) require multiple forms of ID to grant services. For example, the South Carolina DMV requires a minimum of five separate forms of approved ID documenting different characteristics, namely: name and date of birth, social security number, citizenship, residency within the state, and proof of automobile liability insurance. In cases where the applicant's name has changed since birth, the applicant must also provide additional documentation.

Regulatory bodies are often obligated by law to uniquely identify and track individuals. For example the Internal Revenue Service (IRS) is charged with collecting taxes, and the Department of Health and Human Services (HHS) is charged with monitoring and protecting the health of the nation. To satisfy regulatory obligations, organizations are required to include unique individual identifiers on transactional reports. Non-government organizations have similar legitimate needs to uniquely identify and track individual activities (e.g., prevent fraud, provide audit trails, etc.).

It is desirable to balance society's informational needs with the individual's desire to limit unauthorized access to her personal data. Organizations are challenged to authenticate individuals' credentials and fulfill reporting responsibilities without direct access to unique identifiers or personal characteristics of the individual.

Presently the primary method for asserting identity in electronic transactions is through a digital certificate, which identifies its owner, authorizes certain rights or privileges, and may incorporate a tracking number. Unlike traditional certificates in the non-digital world (e.g., driver's licenses, passports, and library cards), digital certificates incorporate a mechanism that allows the owner to demonstrate ownership, namely the certificate owner's public key which is contained within the certificate. This key can be used in a challenge/response sequence to verify that the individual has access to the corresponding private key, thereby demonstrating ownership of the certificate.

At least three entities have a direct interest in the integrity of transactions executed using digital certificates, namely the certificate owner, certificate consumer (e.g., merchants, employers, benefit providers, insurance firms, etc.), and regulatory entities that are obligated to monitor some aspect related to the transaction (e.g., taxation authorities, stock market regulators, health departments, etc.). Based on a review of the published literature, current legislation, and the recent literature related to personal privacy, Table 1 summarizes these constituents' needs with respect to the design of a digital identity certificate and the specific certificate properties required to meet these needs.

Existing certification systems are not designed to mask certificate ownership. In fact, they are designed to do the exact opposite. Traditional non-digital certificates such as passports, driver's licenses, social security cards, etc. have identification numbers uniquely issued to a single individual, specifically to maintain the one-to-one mapping between the certificate and its owner. Similarly, conventional digital certificates are designed to associate a specific individual to his or her public encryption key embedded in the certificate. Although specialized digital certificates with unique features and capabilities have been developed, none address all of the desirable features of privacy preserving certificates identified in Table 1.

For instance, several types of digital certificates have been developed to address specific needs, especially those that arise in electronic transaction environments. In electronic environments, identification and authentication are problematic. Public key encryption technology authenticates authorship, provides confidential communication, recognizes unauthorized modification of a document, and executes legally binding and enforceable digital contracts. For these benefits to be realized, there is a need to provably associate an individual with his or her public key. This is the role of the digital certificate.

Digital certificates are documents created by a certificate authority (CA) and certify that a specific public encryption key belongs to a certain individual or organization. The CA could in principle be any trusted third party possessing a set of public/private keys. The level of trust in a certificate, be it a physical or a digital one, depends on the reputation of its issuer, the auditable procedures by which the certificate can be obtained, and the level of difficulty with which the certificate can be forged.

Once the CA has verified the identity of the individual, the digital certificate would be generated. Information uniquely identifying the individual is immutably embedded in the certificate itself. The widely used, standards-based X.509 v3 digital certificate specifies the structure of the certificate and mechanisms used in its creation. Assuming the technology is secure, it is not possible to falsify a digitally signed document. The individual can prove certificate ownership by demonstrating access to the companion private key associated with the embedded public key. Mechanisms have also been developed for the revocation of issued certificates.

In addition to the standard X.509v3 certificate, other specialty digital certificates have been developed with unique characteristics. Four of these specialty certificates are discussed below, and are included in Table 2 which summarizes the different features of each.

As its name implies, the attribute certificate (AC) is a version of X.509 certificate designed to certify an attribute, or a set of attributes such as group membership, role, security clearance, or other authorization information associated with the AC holder. It is similar to a public key certificate (PKC), except it does not contain a public key. The AC contains the holder's identity, which is digitally signed, and the set of certified associated attributes. The lack of a public key prevents authentication of the holder. This limitation can be addressed by binding it to a PKC.

The properties of an AC are similar to a PKC. The level of trust depends on the reputation of its issuer, the auditable procedures by which the certificate can be obtained, and the level of difficulty with which the certificate can be forged. As with PKC, revocation mechanisms are defined. Since ACs are not designed to certify identity, the ability to detect collusion, prevent pooling and support aggregation is limited, being dependent in part on the embedded identity of the holder.

Unlike conventional digital certificates that provably link a specific individual to her public encryption key, a blind certificate is an authenticated token that does not contain any identity information and is created in such a manner that neither the CA nor anyone else can determine its ownership. As such they are equivalent to a bearer instrument, and do not provide any means for holding the certificate owner accountable. Taking advantage of this characteristic, blind certificates have been used to create digital cash, where banks sign blinded tokens to create a digital form of untraceable, digital money.

Variations of blind certificates have been proposed to extend the usefulness of the scheme. For instance, encryption methods necessary to create limited use certificates have been provided. This type of certificate can be used only a predetermined number of times before its subsequent use reveals its owner's identity (in this sense, digital cash is a single-use certificate). To prevent lending of limited use certificates, it has been proposed that the owner be required to embed some valuable secret (such as access keys to escrow funds). Consequently, the certificate owner would have an incentive to conceal this information and therefore be less likely to lend the certificate. For transactions in person, the use of embedded soft biometric information has been proposed. Soft biometrics are defined as nondistinctive, limitedly permanent human traits such as gender, age, hair color, weight, and height. Revealing a portion of the embedded soft biometrics would limit the ability of individuals other than the rightful owner from using the certificate. Thus, inclusion of biometric information makes it more difficult to lend a certificate.

The fair blind signing protocol introduces a trusted third party such as a judge, who can 'unblind' the certificate in cases where the certificate owner violates the law or does not perform in accordance with a contract. In this way fair blind certificates solve the problem of accountability. Unfortunately, the fair blind signing procedure is inefficient, requiring substantial communication between the certificate holder and the CA. Also, fair blind certificates do not satisfy regulatory reporting requirements. For example, to prevent money laundering and other illegal financial transactions, the IRS requires financial organizations to report large monetary transactions. If transactions are executed using either blind or fair blind certificates, the identity of the transacting parties is hidden, or may not be known with certainty. It is not clear that any regulatory agency would rely on a third party to gain access to information that it is entitled to by law. Also, fair blind certificates do not prevent inappropriate pooling of certificates obtained by multiple individuals, and it may be impossible to ascertain if multiple certificates were issued to the same individual.

With concerns over privacy issues growing, new approaches for how to enhance user control over the identity information carried in a certificate are needed. The user-centric concept aims to provide stronger user control and privacy. A general privacy-enhancing certificate framework to realize the controlled release of certified information has been provided. In this framework, the user has control over which attributes to be certified and revealed in the certificate, and the relations over the attributes are checked to ensure that no side information but only the specified information is revealed. However, the user-centric certificate still reveals some identity information as the user permits.

Thus, a need exists for systems and methods that do not expose any identity information about the user, thus ensuring better privacy protection.

SUMMARY

The present disclosure assumes the existence of a public key infrastructure and that all parties involved in the credentialing process have acquired a publically accessible digital certificate that securely establishes a link between the individual or organization, and its public key. Such an infrastructure currently exists. The public key obtained in this way, here after referred to as an external public key, is used to create digital signatures establishing authorship, and for encrypting transmissions to ensure the communication can only be read by the intended party.

In accordance with certain embodiments of the present disclosure, a method for creating a veiled certificate is provided. The method comprises requesting a certificate from a regulator or certificate authority by sending a secure message with a digital signature of the message signed by the owner. The digital signature is signed and can be verified using a private/public keyset defined externally to the subject system. The message comprises an owner's veiled certificate token, the veiled certificate token comprising an encrypted version of the owner's identification data and the owner's identification public key for the certificate. This token is a critical element of the veiled certificate which allows an individual to aggregate certificates (i.e., combine multiple certificates attesting to different characteristics issued to the same individual), while preventing the inappropriate pooling of certificates issued to different individuals. The message further comprises an identification public key, the message being encrypted using the regulator's public key. The certificate request is validated by verifying the sender's identity through validation of the digital signature using the owner's external public key and verifying the veiled certificate token using the individual's external public key. A veiled certificate is created by combining the veiled certificate token, identification public key, the timestamp along with a digital signature signed by the Certificate Authority. Note that the owner's identification information is inaccessible except to the certificate owner.

In still other embodiments of the present disclosure, a veiled certificate request processing system is provided. The system includes a regulator system that outputs a veiled certificate to an object. The regulator system is in communication with the object to receive a certificate request from the object comprising an input message with a digital signature of the message signed by the owner. The message comprises an owner's veiled certificate token, the veiled certificate token comprising an encrypted version of the owner's identification data and the owner's identification public key for the certificate. The message further comprising an identification public key. The message is encrypted using the device's external public key. The regulator system validates the certificate request by verifying the sender's identity through validation of the digital signature using the owner's external public key and verifying the veiled certificate token using the individual's external public key. The regulator system outputs the veiled certificate by combining the veiled certificate token, identification public key, the timestamp along with a digital signature signed by the Certificate Authority. Note that the owner's identification information is inaccessible except to the certificate owner.

In still other embodiments of the present disclosure, a method for creating a veiled certificate is provided. The method comprises requesting a certificate from a regulator or certificate authority by sending a message with a digital signature of the message signed by the owner using her external keyset. The message comprises an owner's veiled certificate token, the veiled certificate token comprising an encrypted version of the owner's identification data and the owner's identification public key for the certificate. The message further comprises an identification public key and a timestamp that specifies the requested lifetime of the veiled certificate. The certificate request is validated by verifying the sender's identity through validation of the digital signature using the owner's external public key and verifying the veiled certificate token using the owner's external public key. A veiled certificate is created by combining the veiled certificate token, identification public key, the timestamp along with a digital signature signed by the Certificate Authority. Note that the owner's identification information is inaccessible except to the certificate owner.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

Using the existing public key technology, it is possible to return one's PI back to the individual by removing the personal identification information from the digital certificate. This will only work when all needed credentials can be provided by a single credentialing agent. Existing technology cannot return control over one's PI when multiple, independent credentialing agents are needed to provide the necessary credentials (i.e., drivers license, SSN, proof of insurance), because if the identification information is removed, there is no way to prevent the inappropriate combination of credentials issued to multiple individuals. The present disclosure highlights certain important contributions to the field. Namely, the present disclosure identifies a new class of credentialing not previously discussed in the literature—multi-dimensional credentialing, useful when traditional credentials from multiple, independent credentialing authorities must be combined in order to assemble needed endorsements.

In addition, the present disclosure describes the development of a new class of digital certificates, the veiled certificate (hereinafter described as "VC" or "veiled certificate"), which allows individuals to maintain control over their personal information while satisfying the regulatory and reporting needs of today's security conscious environment. The credentialing approach of the present disclosure supports anonymous, multi-dimensional credentialing. In brief, the veiled certificate hides the user's PI while incorporating mechanisms to validate ownership. Third party recipients of a VC can never expose the user's identity (such as with a SSN) since they never have access to it. Multiple VCs (each with a different token and public key) can be issued to the same individual, allowing the individual to control who can cross-link her information. Organizations given the same VC can cross-link her records using the certificate token, otherwise they cannot. Thus, unlike other forms of PI which have a one-to-one relationship with its owner, the support of multiple VCs per individual means that the VCs cannot be used to cross-link systems. Even when an information system is breached and VCs are exposed, they are of little use to the attacker. The embedded authentication system prevents unauthorized use. The user no longer must rely on others to keep identifiers safe. VCs support the aggregation of credentials from independent certificate authorities, yet prevents inappropriate pooling of credentials by multiple individuals. In short, the veiled certificates of the present disclosure improve personal privacy by limiting database cross-linking, thereby reducing the risk of identity theft. The veiled certificate approach is consistent with the concept of user centricity in the prevention of linkability and sharing.

Privacy requires that the individual controls if, when, and how personal information is communicated to others. This requirement creates difficulties when it is also necessary to generate an audit trail. Compromises are necessary making the individual's privacy conditional rather than absolute. The veiled certificate scheme described herein makes it possible to hold the certificate owner accountable, revoke misused certificates, and satisfy legal reporting requirements. Table 3 provides certain notations used in the present disclosure.

In accordance with the present disclosure, the creation of a veiled certificate follows a sequential process that uses existing, well-established processes, in part, for encryption and certificate generation.

Individual Applies for a Veiled Certificate

Initially, a certificate is applied for from a regulator. For instance, an individual (denoted as x) prepares a message to be sent via a private and secure channel to regulator or certificate authority j (denoted as $r_j$) to request the $i^{th}$ certificate. The message contains the individual's identification $ID_x$, the individual's certificate-specific identification public key $K_{x_i}$, a signed version (using the individual's private key $k_i^{-1}$) of these two items equal to $vct_{x_i} = E_{k_i}-1\{ID_x \| K_{x_i}\}$ (hereafter referred to as the "VC token" or simply "token"), the individual's external public key $k_i$ that allows $r_j$ to verify $vct_{x_i}$, any additional evidence $CR_x^j$ needed to prove credential worthiness, along with a digital signature $DS_{x_i}$ of the entire message signed by the individual using her external keyset. To protect the individual's identity, this message must be sent privately to the $r_j$ encrypted using $r_j$'s external public key. Thus, the secure message from x to $r_j$ is:

$$x \to r_j: E_{K_j}\{ID_x \| K_{x_i} \| vct_{x_i} \| TS_{x_i} \| k_i \| CR_x^j \| DS_{x_i}\}$$

where $TS_{x_i}$ is a timestamp that specifies the requested lifetime for the veiled certificate.

Regulator Validates Application

Next, the regulator validates the certificate request. Regulator $r_j$ opens the message and performs one or more of the following validity checks:

a. Verify the sender's identity by validating the digital signature with x's external public key. This is not the public key contained in the request, but rather one designed to establish the identity of the individual. This validates the integrity of the message, and the identity of the sender.

b. Verify credentials of x based on $CR_x^j$. If $r_j$ needs additional evidence, this can be obtained through direct communication with x.

c. Verify the VC token using the individual's external public key, $k_i$:

$$D_{k_i}\{vct_{x_i}\} = D_{k_i}\{E_{k_i}-1\{ID_x \| K_{x_i}\}\} = ID_x \| K_{x_i}$$

Regulator Creates Veiled Certificate

If credentials are verified, the regulator creates a veiled certificate. For instance, once $r_j$ is satisfied with the credentials of the individual, $ID_x$, $CR_x^j$, $vct_{x_i}$, $k_i$, and $DS_{x_i}$ are removed and $r_j$ digitally signs the certificate with $r_j$'s private key $K_j^{-1}$, yielding:

$$VC_{x_i}^j = K_{x_i} \| vct_{x_i} \| TS_{x_i} \| E_{K_j}^{-1}\{MAC(K_{x_i} \| vct_{x_i} \| TS_{x_i})\}$$

MAC stands for message authentication code, which is a hash of $K_{x_i} \| vct_{x_i} \| TS_{x_i}$ and is used to decrease the length of $VC_{x_i}^j$ and to save some signing overhead. Without loss of generality, the unhashed version could be used instead of the hashed version. $r_j$ maintains the pair of $ID_x$ and $vct_{x_i}$ in a list which allows the regulator to use the embedded token to identify the owner of a VC during the lifetime of the VC.

Note that the veiled certificate does not contain any accessible personally identifiable information of the owner. It does contain the token ($TS_{x_i}$) which has the ID embedded in it, but only the individual that requested the certificate has the private key needed to decrypt the token and extract the ID information. While the regulator had access to the ID information from the original certificate request, it is assumed that the regulator can be trusted not to reveal this information.

Third Party Validation of Veiled Certificate

A third party can validate the integrity of the veiled certificate by decrypting the digital signature generated by a regulator using the regulator's external public key. Ownership of the certificate can be verified using a challenge/response process to verify access to the certificate's private key.

Aggregation and validation of multiple veiled certificates is also possible in accordance with the present disclosure. Multiple VCs are needed when a single regulator cannot provide all needed credentials. The owner can aggregate multiple VCs that are obtained from different regulators/CAs to generate a collection of certificates with all desired endorsements and all necessary disclosure mechanisms. Since each VC does not contain information which identifies the owner directly, the common $vct_{x_i}$ and $K_{x_i}$ used by multiple regulators allows the individual certificates to be aggregated. The resulting aggregated veiled certificate (AVC) is:

$$AVC_{x_i} = K_{x_i} \| vct_{x_i} \| TS_{x_i} \| \cup_j E_{K_j}^{-1}\{MAC(K_{x_i} \| vct_{x_i} \| TS_{x_i})\},$$
$$j = 1, \ldots, m.$$

The recipient of the aggregated VC validates each certificate as indicated herein. This validates both the embedded identification public key $K_{x_i}$ and token $vct_{x_i}$ of each certificate. Verifying that all tokens are identical ensures all endorsements were obtained by the same individual using the same public key, and thus are not being inappropriately pooled.

A unique feature of the VC is the token, $vct_{x_i}$. Since $vct_{x_i}$ is based on the user's ID and certificate's identification public key, it links the public key to a specific user while allowing the user to remain anonymous to all but the issuing regulator/CA. Consequently, including a common token in multiple VCs allows the owner to aggregate multiple endorsements into one aggregated VC. This same feature prevents pooling of endorsements from different individuals. Even if two different owners share a common public key, pooling of one individual's certificate obtained from the IRS with another individual's certificate from the Securities and Exchange Commission would be detected, since they are based on different distinguished IDs. Consequently, veiled certificates owned by two different individuals will necessarily have different tokens. Since only VCs with identical VC tokens can be aggregated, inappropriate pooling can be prevented.

This same feature allows the user to control the cross-linking of independently managed databases. For example, an owner could obtain two VCs based on the same unique identifier, such as a social security number but with different public keys, and submit different VCs to different third parties, such as a doctor and employer. It is important to note that while the certificate is based on the social security number, the social security number is not contained within the certificate. This linkage is maintained by the regulator or CA. The certificate only verifies the individual has a valid registration with the regulator. Since the token is based on both the identifier and the public key, the tokens for each VC would be different. Each could still be used to satisfy governmental reporting requirements since the government, as the issuing CA, would have full access to the underlying identifier. However, the two VCs could not be used to link different records from different third parties, such as medical and employment records.

To gain the full benefits of VCs, an individual must manage multiple certificates along with the unique keys associated with them. If the individual has only a single VC, it would uniquely identify the individual just as the social security number presently does. Even if the individual's unique identifier remains constant, getting another VC with a different public/private keyset would change the VC token, thus making it unlinkable to VCs held by other organizations. Unfortunately, doing so requires that the individual manage multiple keys, one for each VC. Certificate management can be accomplished using presently known methods, such as remotely through an Application Service Provider (ASP) service, or locally, using a personal key escrow scheme. Under the ASP model, the user is authenticated with the ASP server through a link, such as a secure link. A menu could display the user's list of current certificates, her associated private keys, and an indication of where these certificates have been used. To prevent the CA from linking and profiling the certificate holder, the VCs private keys are stored in encrypted form and decrypted by the certificate holder only at the time of use.

Local key management can be accomplished by using an embedded, personal key escrow system, where the VC would embed the matching decryption key $K_{x_i}^{-1}$ for the certificate-specific key $K_{x_i}$, encrypted with the certificate owner's symmetric secret key, $s_x$. The resulting certificate would thus be:

$$AVC_{x_i} = K_{x_i} \| vct_{x_i} \| TS_{x_i} \| \cup_j E_{K_j}^{-1} \{MAC(K_{x_i\|vct_{x_i}} \| TS_{x_i}) \} \| E_{s_x} \{K_{x_i}^{-1}\}, \forall j=1, \ldots, m$$

Since $s_x$ is a symmetric key, the certificate owner can reclaim the decryption key for any issued VC directly from the certificate by applying $s_x$ to the embedded key escrow term, i.e., $D_{s_x}\{E_{s_x}\{K_{x_i}^{-1}\}\} = K_{x_i}^{-1}$. This reduces key management to only having to manage a single key, the user's personal symmetric key $s_x$.

Table 2 summarizes features supported by the different certificate types and compares the same with those described in the present disclosure. Conventional X.509 digital certificates provide many desirable characteristics except privacy since the individual's identity is explicitly included in plaintext on the certificate. In contrast, blind certificates (including limited show certificates) provide privacy, but do not provide accountability, or an audit trail, and cannot be used in a regulatory reporting context since it is not possible to link a blind certificate to its owner after it has been signed. Fair blind certificates provide methods for revocation, and limited owner accountability, but fail to support regulatory reporting requirements since the owner's identity is not expressly given. Among the credentialing schemes that support privacy of the certificate owner, this feature is unique to VCs.

The present disclosure recognizes and addresses the limitations of the prior art. For instance, credentials are created in a secure, verifiable manner. The message from individual x seeking his or her $i^{th}$ certificate from the $j^{th}$ CA is $ID_x \| K_{x_i} \| vct_{x_i} \| TS_{x_i} \| k_j \| CR_x^j \| DS_{x_i}$. By verifying the digital signature $DS_{x_i}$, the CA establishes the integrity of the message request, as well as x's identity. Based on the contents of message, the CA can also verify that the token $vct_{x_i}$ was created appropriately, thereby linking the public key $K_{x_i}$ to the user x. Based on the verified identity information, the CA would determine the appropriate credential level from the credential issuer (CI). Following these checks, the CA creates and signs the VC.

From the assumptions, the CA's signature cannot be forged, so the certificate is issued with the proper endorsements to the individual whose credentials and identity have been verified. Similarly, it is not possible to change either the embedded public key or the certificate token after signing without invalidating the certificate since the CA's signature would no longer match the certificate contents.

This entire process can be audited in real time or ex post if the trusted auditor is given access to the message traffic seen by the CA. Consequently, the VC contains only items verified by the CA, and this verification process can be audited.

In addition, misuse of the certificate can be prevented. By assumption, the CA's signature cannot be forged and the individual's private key cannot be broken. Unless the individual voluntarily discloses the private key, a third party cannot provide an authenticated signature that is validated using the identification public key $K_{x_i}$ contained in the VC of individual x. Thus, it is not possible for a third party to utilize somebody else's certificate without her cooperation. Since all credentials in an aggregated certificate must be verified using the same veiled token, it is not possible to pool credentials. Finally, as has been previously proposed and as is discussed in more detail herein, soft biometric information can be embedded in a tamper-proof smart card implementation of a certificate for presentation in a face-to-face environment. It is noted that a similar approach is adopted with some, but not all traditional certification schemes (driver's licenses and passports include biometric data while current U.S. social security cards do not).

In accordance with the present disclosure, credentials can be revoked. If a private key is misused, misplaced or stolen, the corresponding certificate key, $K_{x_i}$, can be put on a revocation blacklist that can be accessed by anyone verifying the VC. This process is currently in use with conventional digital certificates, and efficient revocation list mechanisms are known in the art.

In addition, accountability and audit trails are supported by the present disclosure. All correspondence with an individual will be encrypted with her certificate's identification public key. Since the present disclosure assumes that the user protects her private key, this limits access to the certificate holder. Similarly, any message signed with $K_{x_i}^{-1}$ will be uniquely tied to the owner of the certificate with public key $K_{x_i}$. To audit a financial transaction, the auditor can verify the credentials of the individual through direct inspection of the signatures on the VC. The auditor can also verify that all reporting requirements have been met by inspecting the message log of the transacting parties to see if the required messages have been sent to the regulating authority. If the identity of the transacting parties is needed, the auditor can get the identity information from the CA, provided that the conditions for VC issuance stipulates auditor access to identity information, or if a court order for disclosure of identity is obtained.

Regulatory reporting requirements can also be satisfied with the present disclosure. Regulatory reporting requirements can be satisfied by including the regulatory agency as a signatory on the VC, that is, the regulatory agency is a dual CI/CA. The VC token then uniquely identifies the individual to the CA, much as the U.S. Federal Government uses the Social Security number to uniquely identify individuals. While there might be a one to many relationships between an individual and her tokens, the CA can establish ownership of each certificate since the CA has access to the original identity information used to create the tokens through the paired list of $ID_x$ and $vct_{x_i}$.

Also, in accordance with the present disclosure, privacy can be preserved while preventing cross-linking of data sources. The identity information embedded in the certificate token is hidden from everyone except the originating CA. Transactions that use the same VC can be linked, however the identity of the certificate owner is not revealed. If the individual chooses to use each VC only once, it is impossible for non-authorized individuals to associate transactions that use different certificates since the different certificates do not have any visible elements that would link them to each other (i.e., they have different keys and different tokens even if they have the same distinguished ID). Thus, transaction analysis cannot be applied to cross-link independent databases using VCs if the individual frequently changes certificates.

Figure 1:
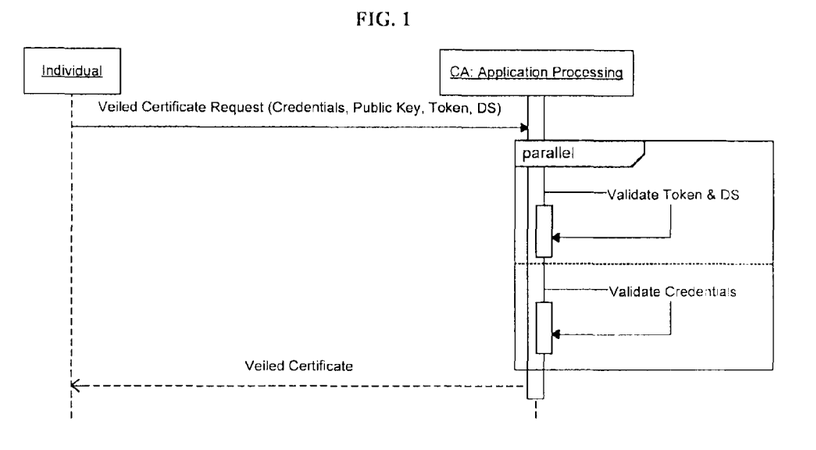
FIG. 1 illustrates a UML sequence diagram to acquire veiled certificates.

In addition, the present disclosure provides a process to implement veiled certificates. Interaction takes place between the individual and the entity providing the certification (e.g., credit card account, Medicare account, prescription insurance, and the like) as illustrated in the sequence diagram provided in FIG. 1. An individual can securely send a CA the necessary credentials, public key, VC token, and digitally signing this information with her private key. The CA validates both the veiled certificate request by checking the integrity of DS, and also verifies the token is created properly. In parallel, the CA validates the individual's credentials ensuring that the individual is eligible for the requested certificate. Assuming everything is in order, the CA generates the requested veiled certificate which is securely transmitted to the individual.

Figure 2:
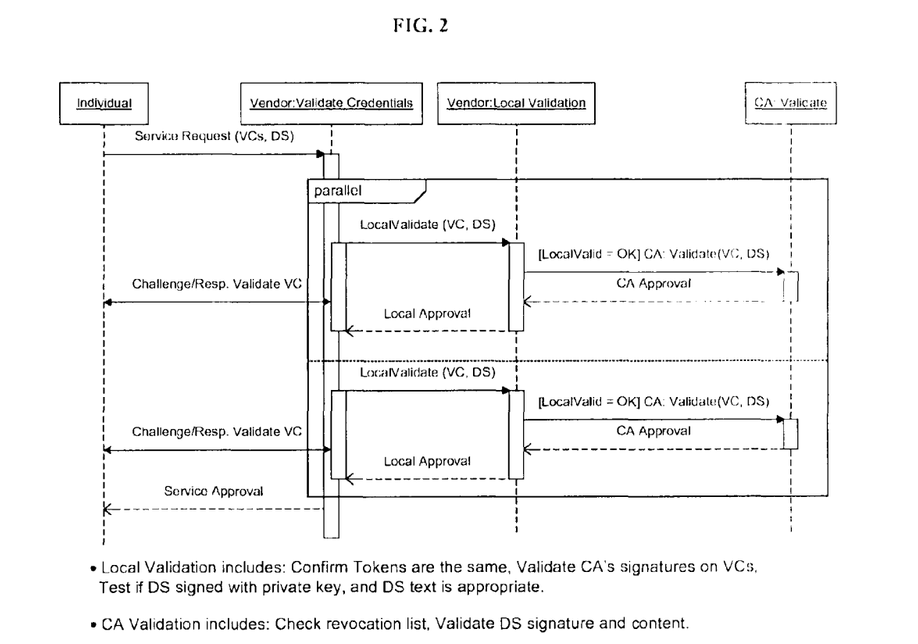
FIG. 2 illustrates a UML sequence diagram to approve a veiled certificate.

Once the customer has acquired the necessary veiled certificates, they can be stored on an electronically readable medium, such as a smartcard, a properly equipped cell phone, or the like. The customer then brings this device to the point of sale (POS). At the time of transaction, the customer connects the device, possibly wirelessly, to the POS terminal and completes the transaction in accordance with the sequence diagram provided in FIG. 2. The individual can securely send a request for service to the vendor. Assuming this request involves aggregated certificates, the vendor could process each certificate separately. The vendor would locally verify the integrity of the certificate, including that the certificates are owned by the submitting individual (through a challenge/response protocol checking for access to the associated private key, or the like), that the tokens are identical in the case of aggregated certificates, that the CA has properly signed each certificate, and that the messages themselves have been properly signed by the individual. If the certificates locally validate, the CA is contacted to ensure the certificates have not been revoked. If the certificate is valid, the CA sends its approval. When all credentials have been verified, the vendor approves service to the individual.

The impact of moving to a VC will be particularly beneficial to the certificate holder. As with any public key based digital certificate scheme, the present disclosure provides secure credentials whose ownership can be authenticated using the embedded key. The VC has the unique feature that the certificate holder controls the ability of others to use the certificate ID (i.e., token) as an identifier to link multiple data sources, as is commonly done with social security numbers and other identifiers today. VCs allow the aggregation of multiple certificates from the same individual when a single certificate does not contain the necessary endorsements, and prevents the inappropriate pooling of endorsements by multiple individuals.

Identification cards used today typically use relatively short, often user-friendly identification (ID) numbers as in the case of driver's licenses and social security numbers. The VCs contemplated by the present disclosure can require a much longer ID number to accommodate the information stored in the certificate, and to provide for the large number of certificates issued per individual. This longer ID, possibly created with an extended character set, would suggest that recording, transmission, and processing of the certificates would necessarily be done electronically to avoid transcription errors. This is technologically possible today with smart cards, PDAs, intelligent cell phones, or the like. Such devices could embed biometric access control (such as fingerprint recognition) as well as a challenge-response password system to improve security. All certificate-related processing would take place on the device (instead of on the retailer's POS system) and the device could store all certificates the customer might want to carry.

The CA is concerned with the cryptographic strength of the certificate protocol, and the computational resources to create and verify the certificates. A VC is compatible and consistent with the International Telecommunication Union's (ITU) X.509 v3 standard for public key certificates and infrastructure as shown in Table 4. Effectively, the standard certificate is unchanged except the VC token is inserted into the Extensions field, whereas the Subject field, which traditionally holds a unique, 'distinguished name' of the certificate owner, is left blank. Consequently, the existing public key infrastructure (PKI) for handling and processing X.509 certificates can also handle VCs.

Using the existing PKI has a number of advantages. It builds on a well-established standard, which includes a network of established certifying authorities. The standard already includes mechanisms for key recovery and certificate revocation. To efficiently handle the large number of key pairs associated with VCs, the personal key escrow scheme previously discussed could also be implemented within the X.509 standard using the optional extensions introduced in version 3. Since the same encryption protocols are used, VCs have identical cryptographic strength and computational requirements as standard X.509 certificates. The validity of the VC signing protocol follows immediately from the validity of the X.509 protocol and the underlying encryption method. VCs would also automatically benefit from future cryptographic advancements as they are incorporated into the X.509 standard.

The shift to digital certification provides the certificate consumer a higher level of authentication than provided with paper-based certificates. Cryptographic technology can be used to verify both certificate authenticity and certificate ownership, thereby reducing the risk of accepting false identification.

An alternate to incorporating soft biometrics is to use hard biometrics (commonly shortened to biometrics) such as fingerprints, iris scans, hand geometry, palm print scanning, retinal scanning, etc. for identity authentication. To incorporate biometrics into a veiled certificate and still maintain certificate non-linkability, the present disclosure contemplates encrypting a modified version of the biometric information with the certificate specific public key this is already part of the VC. Since each VC uses a different public/private keyset, encrypting the biometric information will result in a unique biometric template that is unlinkable with encrypted biometric information stored in other certificates. To adapt to minor variations typical of biometric scanning, the present disclosure adapts the approach outlined by Burnett, A., Byrne, F., Dowling, T., & Duffy, A., 2007, "A biometric identity based signature scheme", International Journal of Network Security, 5(3), 317-326, available at: http://ijns.nchu.edu.tw/contents/ijns-v5-n3/ijns-2007-v5-n3-p317-326.pdf, accessed on Nov. 25, 2009, and Dodis, Y., Ostrovsky, R., Reyzin, L., and Smith A. 2008. "Fuzzy Extractors: How to generate strong keys from biometrics and other noisy data", SIAM Journal on Computing, 38(1), 97-139 available at http://arxiv.org/pdf/cs.CR/0602007 accessed on Dec. 11, 2009, both incorporated by reference herein, to convert the scanned biometric information into an unique ID string and then use that string in place of the biometric template. The approach described herein differs substantially from the above approaches in that they do not maintain the anonymity of the individual, while the procedures discussed below modifies the biometric information such that it is unlinkable to the individual and other certificates issued to the same individual. Upon presenting the certificate, the individual would be scanned for the appropriate biometric information, whereby it would be converted to an ID string, transform the biometric, and compared against the reference biometric information that had previously been similarly processed and embedded on the certificate. The intent is that the verifier would not store the raw biometric information nor the ID string derived from the biometric scan. Doing so would circumvent the measures taken to prevent the use of the VC as a means to associate different VCs issued to the same individual.

Figure 3:
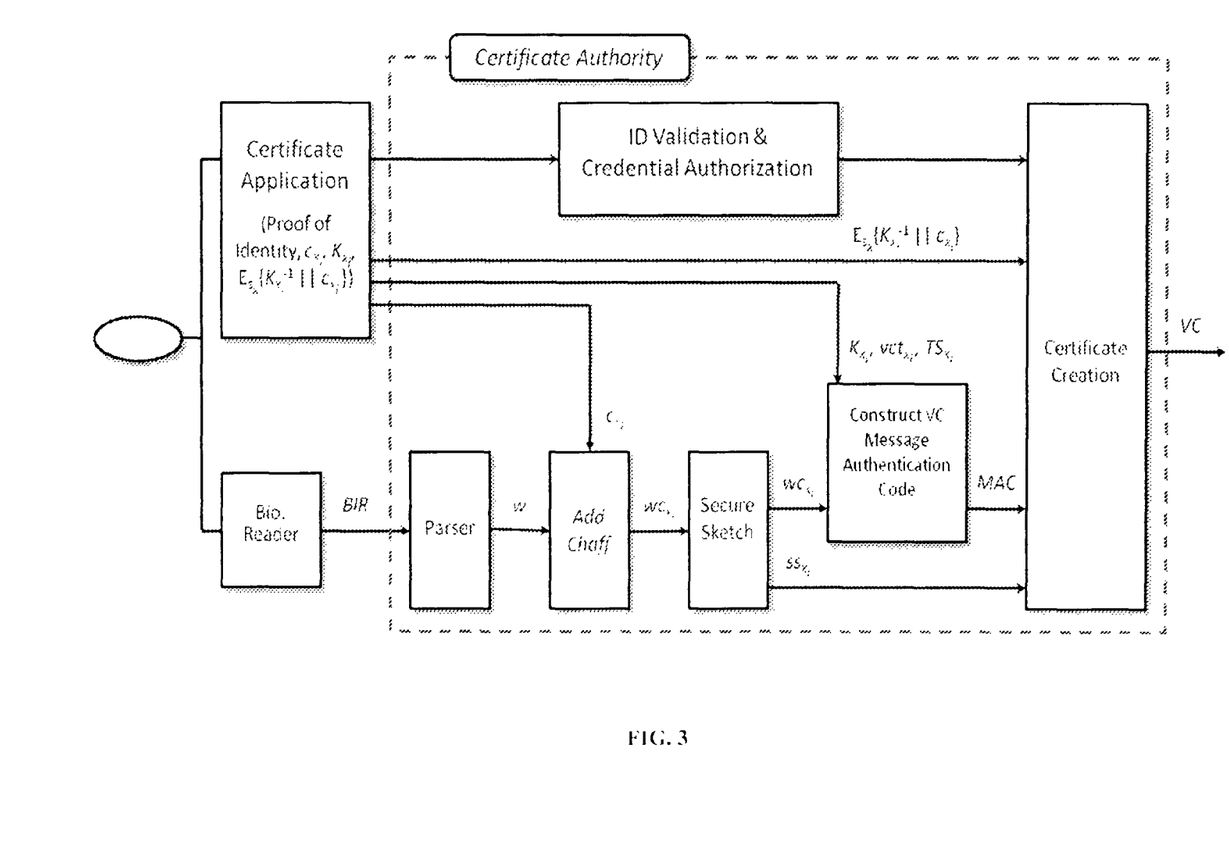
FIG. 3 illustrates an overview of the process to incorporate biometrics authentication into veiled certificates.

FIG. 3 illustrates the procedure of incorporating biometrics information into a veiled certificate without enabling cross-linking of separate certificates. To request the $i^{th}$ certificate, an individual x must supply to the certificate authority the required information including proof of identity, a random chaff ($c_{x_i}$) specific to the certificate, an identification public key ($K_{x_i}$) specific to the certificate, and an escrowed version of the corresponding private key $K_{x_i}^{-1}$ and the chaff $c_{x_i}$ using the owner's secret key ($E_{s_x}\{K_{x_i}^{-1}\|c_{x_i}\}$). The certificate authority would also scan the individual to derive a reference biometric information record (BIR) of the individual. The BIR would be parsed to generate a biometric template (w). Random chaff is added to the biometric template to obscure the secure sketch which is generated in the next step. The Secure Sketch generator will take the modified biometric template and create a unique sketch string. This sketch string is important because the process of deriving the biometric template from the individual's scan is noisy, i.e. the biometric template is slightly different every time. As described in Dodis 2008, it is shown that there exists an effective Secure Sketch generator function that can create a unique sketch string which allows a Fuzzy Extractor to tolerate noise (as long as the noise is sufficiently small) and reproduce the exact original biometric template. The secure sketch string $ss_{x_i}$ is included in the VC in clear, the modified biometric template is included in the message authentication code (MAC) of the VC, and the random chaff would be escrowed along with the private key of the VC.

The incorporation of biometrics information into the veiled certificate can be implemented by extending the above step for the creation of the original veiled certificate as follows:

Extended Step: Regulator creates Veiled Certificate with Biometrics incorporated—This step consists of two sub-steps:

Obtain the biometrics and produce a secure sketch of biometrics—The regulator $r_j$ obtain $BIR_x$ of individual x, parse it into $w_x$, and use a public shuffling function F along with a certificate-specific random chaff $c_{x_i}$ to get a certificate-specific $wc_{x_i}$ as follows:

$wc_{x_i} = F(w_x, c_x)$

Then, $r_j$ uses a secure sketch generator function SS to calculate the sketch string $ss_{x_i}$ of $wc_{x_i}$ as follows:

$ss_{x_i} = SS(wc_{x_i})$

Incorporate biometrics information and secure sketch into the Veiled Certificate—Once $r_j$ is satisfied with the credentials of the individual, $ID_x$, $CR_x^j$, $vct_{x_i}$, $k_i$, and $DS_{x_i}$ are removed and $r_j$ digitally signs the certificate with $r_j$'s private key $K_j^{-1}$, yielding:

$VC_{x_i}^j = K_{x_i}\|vct_{x_i}\|TS_{x_i}\|ss_{x_i}\|E_{K_j}^{-1}\{MAC\ (K_{x_i}\|vct_{x_i}\|TS_{x_i}\|wc_{x_i})\}\|E_{s_x}\{K_{x_i}^{-1}\|c_{x_i}\}$ MAC stands for message authentication code, which is a hash of $K_{x_i}\|vct_{x_i}\|TS_{x_i}\|wc_{x_i}$ and is used for keeping the length of $VC_{x_i}^j$ short and to save some signing overhead. The sketch string $ss_{x_i}$ is included in the certificate because it is needed by the verifier to recover $wc_{x_i}$ from a sufficiently close value $wc'_{x_i}$ obtained from scanning the user's biometric. Note that $ss_{x_i}$ can be sent in clear because it does not reveal information about $wc_{x_i}$. Secure sketches for separate certificates cannot be associated since they are based on different $wc_{x_i}$ with certificate specific random numbers $c_{x_i}$. Also note that $c_{x_i}$ is escrowed along with the certificate-specific identification private key $K_{x_i}^{-1}$ so that the individual does not need to remember many c's for all the certificates she owns.

Figure 4:
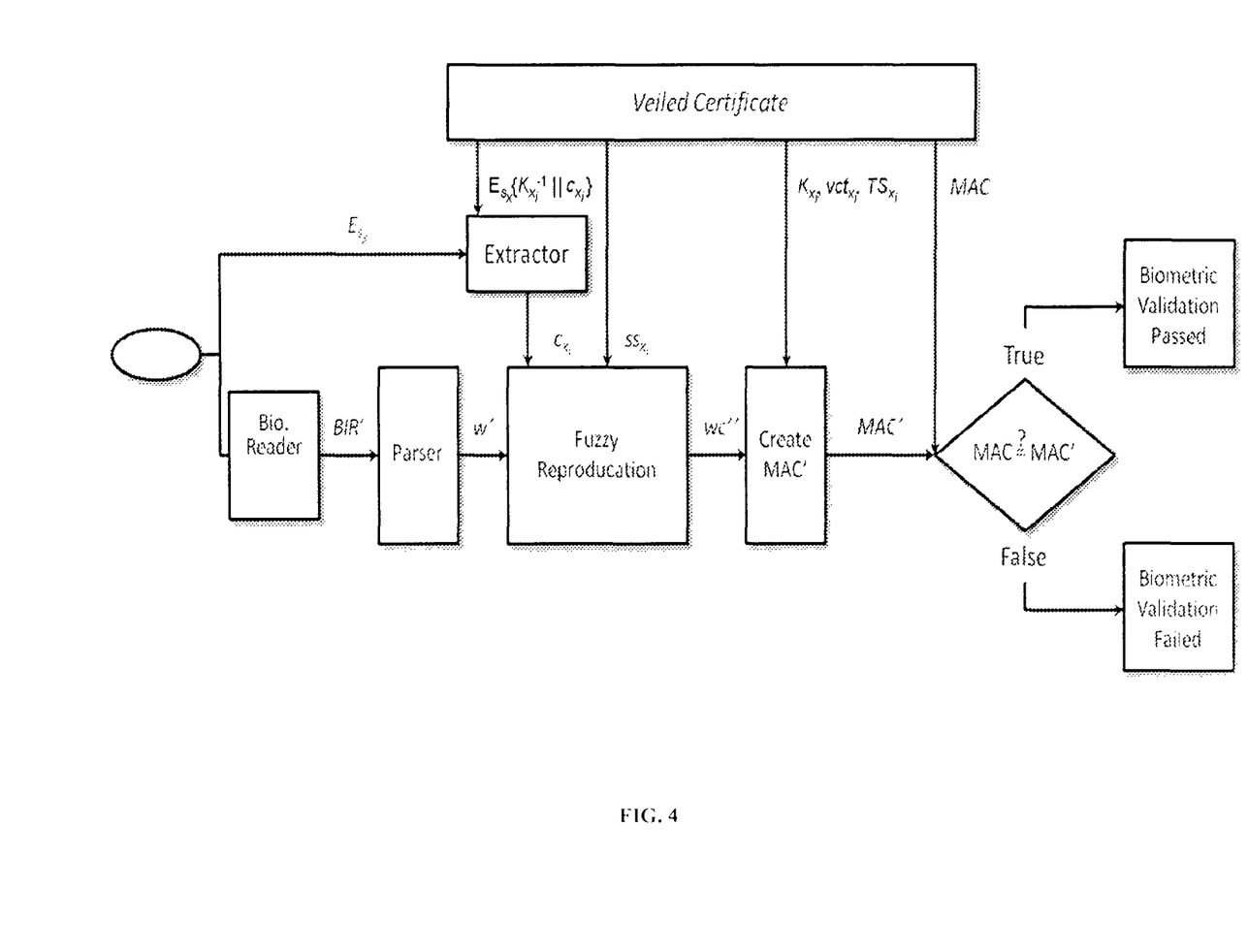
FIG. 4 illustrates an overview of the process to authenticate biometric identity using veiled certificates.

Using the proposed scheme will extend the validation of the veiled certificate to be a two factor authentication procedure. First, as in the case of the original veiled certificate, the user would need to be able to properly respond to a challenge/response test by proving her access to the certificate's private key. Then the user also needs to pass the biometric authentication. The biometric authentication process is illustrated in FIG. 4. The third-party verifier would use a biometric reader to obtain a sample biometric information record (BIR') from the user. This is then parsed to extract the biometric template (w'). The user would access the veiled certificate with her secret key to obtain the escrowed version of the random chaff ($c_{x_i}$) and pass it to the Fuzzy Reproduction generator. The Fuzzy Reproduction generator takes w', $c_{x_i}$ and the secure sketch string ($ss_{x_i}$) as input to produce a biometric template (wc"). If sample w' is sufficiently close to reference w, the biometric template produced (wc") will be identical to the reference template (wc). This sample biometric template is then compared against the reference template stored in the certificate by calculating the corresponding MAC'. If the distance between the reference biometric template (w) and the sample biometric template (w') is less than the tolerance (t) specified, then the Fuzzy Reproduction generator is able to reproduce the original reference biometric template, resulting in MAC' equaling MAC; thereby authenticating the biometric identity, otherwise the biometric authentication fails.

To implement the two-factor authentication procedure described above, the above described step for the validation of the original veiled certificate can be extended as follows:

Extended Step: Third Party Validation of Veiled Certificate with Biometrics incorporated—A third party can validate the veiled certificate with the following two sub-steps:

Verify the integrity and ownership of the Veiled Certificate—A third party can validate the integrity of the veiled certificate by decrypting the digital signature generated by a regulator using the regulator's public key. Ownership of the certificate can be verified using a challenge/response process to verify the individual's access to the certificate's private key.

Verify the biometrics of the certificate owner—The third-party verifier uses a biometric reader to obtain a sample biometric information record $BIR'_x$ from the user x, which is then parsed to extract the biometric template $w'_x$. Then the user accesses the veiled certificate and uses her secret key to obtain the escrowed certificate-specific random chaff $c_{x_i}$ which she provides to the verifier. The verifier takes $w'_x$ and $c_{x_i}$ and uses the public shuffling function F to produce $wc'_{x_i}$ as follows:

$$wc'_{x_i} = F(w'_x, c_{x_i})$$

Next, the Fuzzy Reproduction generator takes $wc'_{x_i}$ and the secure sketch string $ss_{x_i}$ included in the VC, and recovers a value $wc''_{x_i}$, which is compared against the reference value stored in the certificate by calculating $$MAC(K_{x_i} \| vct_{x_i} \| TS_{x_i} \| wc''_{x_i}) = ? \ MAC(K_{x_i \| wc x_i} \| TS_{x_i} \| wc_{x_i})$$

If the user is the certificate owner, then the recovered $wc''_{x_i}$ should be equal to $wc_{x_i}$, and thus MAC $(K_{x_i} \| vct_{x_i} \| TS_{x_i} \| wc''_{x_i}) = MAC(K_{x_i} \| vct_{x_i} \| TS_{x_i} \| wc_{x_i})$, hence the biometric identity is authenticated. Otherwise the authentication fails.

This approach maintains the unlikability of the veiled certificates. The information added to the VC to support veiled biometric authentication is: an escrowed version of the random number unique to the certificate; secure sketch string $ss_{x_i}$; and a modified version of the MAC incorporating the reference biometric template ($wc_{x_i}$), where both $ss_{x_i}$ and $wc_{x_i}$ are derived from the reference biometric image (w) coupled with the certificate-specific random number ($c_{x_i}$). Obscuring the biometric template with the random number prior to executing the Secure Sketch process effectively hides the user's information. Without this step the secure sketch string $ss_{x_i}$ would be common for all user certificates. $wc_{x_i}$ is further obscured by including it in the certificate's MAC.

Processing digital certificates requires appropriate hardware and software to read and validate the cryptographic signatures. These are currently in commercial use for other applications where digital credentials contained on smart cards are authenticated across a secure network. Security can be further enhanced by embedding soft biometric data, as previously described, or by requiring the user to enter a personal identification number.

It is also important to be able to audit and verify processes. On the surface, VCs appear to contradict this trend by providing credentials that mask the identity of the credential holder. However by design, the CA that created the certificate has the ability to unilaterally break this anonymity. For transactions that require government reporting, the CA can be a government agency thereby giving the government direct access to the embedded identity information.

Veiled certificates can be implemented and managed within the existing X.509 standard so the computational demands of VCs should be no different than that experienced with traditional digital certificates. If individuals create multiple VCs over time compared to a single certificate, as would be expected with traditional certificates, the CA must scale its operations accordingly. However, since each certificate can be processed independently, the CA's computational burden can be accelerated using parallel multi-processing, as is common with server farms or the like.

As more transactions take place between individuals who never meet, authentication has become one of the most important requirements for providing a robust platform for the electronic commerce process. When parties to a transaction do not mind being identified, a standard digital certificate issued by a trusted CA can be used as an electronic identification card. The owner of a digital certificate can prove authenticity and ownership through a challenge/response scheme without ever relying on shared secret information such as credit card expiration dates, mother's maiden name or other secret information. Using the identity information contained in the certificate, parties to a transaction can establish important attributes such as credit card ownership, access rights, credit worthiness, reputation, etc.

When one of the parties to the transaction wishes to retain its privacy, the issues of authentication and quality assurance become quite difficult, since such quality information is typically associated with the identity of the individual or company. Add to this mandatory governmental reporting requirements related to transactions, and the solution to these conflicting needs of privacy, authentication and disclosure becomes non-trivial.

It is in this context that the concept of veiled certificates is provided. The VC breaks the link between identity and certificate owner characteristics, as far as her transacting partners are able to see. At the same time, the certificate owner can be held accountable if fraudulent behavior is detected. The transacting partner can verifiably satisfy all mandatory reporting requirements without ever knowing the certificate owner's identity or PI. This is in contrast to the present situation, where each user must supply unique identifier information such as a social security number or the like.

While the benefits of VCs in electronic transactions have been established, many other applications are contemplated. Veiled certificates utilize existing technology and can be implemented within the current standards and public key infrastructure. Example application areas include the creation of veiled social security cards (or other identity cards) to prevent unauthorized profiling of individuals, veiled credit cards so as to prevent data mining and invasion of privacy, and veiled medical identification numbers to protect sensitive medical information.

In the interests of brevity and conciseness, any ranges of values set forth in this specification are to be construed as written description support for claims reciting any sub-ranges having endpoints which are whole number values within the specified range in question.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

TABLE 1

| Desirable characteristics of certificates | | |
| --- | --- | --- |
| Desirable Certificate Characteristics | Required Properties | Interested Constituent |
| a) Credentials created in a secure, verifiable manner | i) Non-forgeable, verifiable certification. | Consumer of Certificate |
| b) Prevent misuse of the certificate (i.e., identity theft) | ii) Detect collusion - sharing single ID among multiple individuals | |

TABLE 1-continued

Desirable characteristics of certificates

| Desirable Certificate Characteristics | Required Properties | Interested Constituent |
|---|---|---|
| | iii) Prevent pooling of different people's certificates | |
| | iv) Allow aggregation | |
| c) Support credential revocation | v) Allow credential revocation for cause | |
| d) Suitable for establishing accountability and an audit trail (i.e., track financial transactions) | vi) Support an audit trail that can link actions to a single, identifiable individual | |
| | vii) Allow access to individual's identity in case of illegal activities or breach of contract | |
| e) Satisfy regulatory reporting requirement to identify individuals (i.e., IRS requires reporting of social security number) | viii) Include certificate owner identity in such a way that only the intended recipient can access it, or that cannot be changed without detection | Regulatory Agencies (i.e., IRS, SEC, Dept. of HHS) |
| f) Preserve individual's privacy - prevent cross-linking of different data sources (i.e., address surrogate key problem) | ix) Support limited anonymity<br>x) Support absolute anonymity | Certificate owner |

TABLE 2

Properties of different types of traditional and digital certificates

| Feature | Traditional Non-Digital | Conventional Digital (X,509) | Attribute Certificates (part of X,509v3)[1] | Blind | Fair Blind | User Centric | Veiled |
|---|---|---|---|---|---|---|---|
| Uses | Driver's license, passport | Certification of public keys | Membership, access control, data origin authentication | Digital currency (ecash) | Revocable certifiable credentials | Control over attribute release | Social security certificate |
| Prevent Certificate Counterfeiting | Limited[2] | Yes | Yes | Yes | Yes | Yes | Yes |
| Detect Collusion (sharing of certificate) | Yes[3] | Yes[3] | Limited | Yes[3] | Yes[3] | Yes | Yes[3] |
| Preventing Pooling (combine different people's certifications) | Yes | Yes | Limited | No | No | Yes | Yes |
| Support Aggregation (combine your own certifications) | Yes | Yes | Limited | No | No | Yes | Yes |
| Support Revocation | Yes | Yes[4] | Yes | No | Yes | Yes | Yes |
| Support Audit Trail | Yes | Yes | No | No | No | Yes | Yes |
| Support Accountability | Yes | Yes | No | No | Yes | Yes | Yes |
| Satisfy Regulatory Reporting Requirements | Yes | Yes | No | No | No | Yes | Yes |
| Support Limited Anonymity (judge can break anonymity) | No | No | No | No | Yes[5] | No | Yes |
| Support Absolute Anonymity (no one can break anonymity) | No | No | No | Yes | No[5] | No | No |

[1] Assumes use of an Attribute Certificate without a Public Key Certificate. Since ACs do not support holder authentication, properties dependent on holder identity are No
[2] Conventional certificates do not contain counterfeit deterrents, although such schemes are being added to some certificates (i.e. holograms on driver's licenses).
[3] Biometric or personal data contained on the certificate could help detect misuse.
[4] Revocation requires checking with a central clearing house to confirm active status.
[5] Depends on the scheme. Some schemes guarantee anonymity if the certificate holder follows the guidelines of the certifying agent, but allows anonymity to be broken in the case of abuse.

TABLE 3

Notation

| | |
|---|---|
| $K_{x_i}$ | Identification public key for individual x's $i^{th}$ certificate |
| $K_{x_i}^{-1}$ | Matching private key for $K_{x_i}$ |
| $s_x$ | Symmetric, secret key for individual x |
| $vct_{x_i}$ | VC token for individual x's $i^{th}$ certificate |
| $K_j$ | External public key of the regulator j |
| $K_j^{-1}$ | Matching private key for $K_j$ |
| $CR_x^j$ | Evidence of individual x's credential worthiness for regulator j |
| $ID_x$ | Identity information of individual x |
| $k_i$ | External public key used to establish identity with regulating authorities for ith certificate |
| $k_i^{-1}$ | Matching private key for $k_i$ |
| $E_k \{ M \}$ | Curly brackets indicate that message M has been encrypted using key k. |
| $D_k \{ M \}$ | Curly brackets indicate that message M has been decrypted using key k. |
| MAC { M } | Curly brackets indicate that an appropriate hash function is applied on message M to derive a message authentication code (MAC). |
| ‖ | Concatenation of fields into a message packet |
| DS | Digital signature of a message, verifiable with sender's external public key |
| TS | Timestamp that specifies the requested lifetime of a VC |
| BIR' | Sample biometric information record submitted for authentication |
| $BIR_x$ | Reference biometric information record for individual x |
| $c_{x_i}$ | Random chaff used to obscure $w_x$ for $i^{th}$ certificate for individual x |
| $F(w_x, c_{x_i})$ | Shuffling function that combines $w_x$ and $c_{x_i}$ and outputs $wc_{x_i}$ |
| MAC' | MAC code generated with $wc'_{x_i}$ |
| SS | Secure sketch generating function, which takes $wc_{x_i}$ as an input and outputs $ss_{x_i}$ |
| $ss_{x_i}$ | Secure sketch string for $i^{th}$ certificate for individual x |
| t | Allowable tolerance between $w_x$ and w' such that the Fuzzy Reproduction generator can recreate $w_x$. |
| w' | Sample biometric template derived from BIR' |
| wc" | Biometric template created using Fuzzy Reproduction generator using w', $c_{x_i}$ and $ss_{x_i}$ |
| $wc_{x_i}'$ | Obscured sample biometric template for $i^{th}$ certificate for individual x |
| $wc_{x_i}$ | Obscured reference biometric template for $i^{th}$ certificate for individual x |
| $w_x$ | Reference biometric template for individual x |

TABLE 4

The X.509 v3 certificate structure.

| X.509 certificates | Veiled Certificates |
|---|---|
| Version | * |
| Serial Number | * |
| Algorithm ID | * |
| Issuer | * |
| Validity Period | * |
| Subject | blank |
| Subject Public Key Info | * |
| Public Key Algorithm | * |
| Subject Public Key | * |
| Issuer Unique Identifier (Optional) | * |
| Subject Unique Identifier (Optional) | * |
| Extensions (Optional) | Veiled Certificate Token |

* same content as X.509 v3

What is claimed is:

1. A method for creating veiled certificates, the method comprising:

requesting a certificate from a regulator by sending a message with a digital signature of the message signed by an owner, the message comprising the owner's veiled certificate token, the veiled certificate token comprising an encrypted version of the owner's identification data and the owner's public key for the certificate, the message further comprising an identification public key, the message being encrypted using the regulator's external public key;

validating the certificate request by verifying the sender's identity through validation of the digital signature using the owner's external public key and verifying the veiled certificate token has been created properly using the identification public key;

creating a veiled certificate by combining the veiled certificate token, identification public key, and digitally signing the veiled certificate with regulator's private key, wherein the owner's identification information is inaccessible from the veiled certificate, except to the certificate owner;

requesting a certificate from a second regulator by sending a message with a digital signature of the message signed by the owner, the message comprising the owner's veiled certificate token, the veiled certificate token comprising the owner's identification data and the owner's public key for the certificate, the message further comprising the identification public key, the message being encrypted using the second regulator's external public key;

validating the certificate request by verifying the sender's identity through validation of the digital signature using the owner's external public key and verifying the veiled certificate token using the identification public key; and creating a second veiled certificate by combining the veiled certificate token, identification public key, and digitally signing the second veiled certificate with second regulator's private key, wherein the owner's identification information is inaccessible from the second veiled certificate, except to the owner.

2. The method of claim 1, further comprising third party validation of the veiled certificate comprising:

validating the integrity of the veiled certificate by decrypting the digitally signed veiled certificate using regulator's external public key; and verifying ownership of the veiled certificate, wherein none of owner's identification data is provided to the third party.

3. The method of claim 1, further comprising aggregating the first and second veiled certificates.

4. The method of claim 3, further comprising third party validation of the aggregated veiled certificates comprising:

validating the integrity of the veiled certificates by decrypting the digitally signed veiled certificates using the regulators' external public keys; and verifying ownership of the veiled certificates, wherein none of owner's identification data is provided to the third party.

5. The method of claim 1, wherein the message further comprises a timestamp that specifies the lifetime of the veiled certificate.

6. The method of claim 1, wherein the message further comprises additional evidence to prove credential worthiness, such additional evidence being removed when the veiled certificate is created.

7. The method of claim 1, wherein the message further comprises an escrowed version of the private key corresponding to the identification public key embedded in the veiled certificate to aid in key management.

8. The method of claim 1, wherein the message further comprises biometric information, such biometric information being present in the veiled certificate.

9. The method of claim 8, wherein the biometric information comprises an iris scan, facial scan, hand geometry, palm print, finger print, retina scan, or other hard biometric data.

* * * * *